United States Patent
Kelley et al.

(10) Patent No.: US 8,993,187 B2
(45) Date of Patent: Mar. 31, 2015

(54) METHOD AND DEVICE FOR LIMITING CROSSOVER IN FUEL CELL SYSTEMS

(75) Inventors: Ronald James Kelley, Coral Springs, FL (US); Steven Duane Pratt, Fort Lauderdale, FL (US); Sivakumar Muthuswamy, Plantation, FL (US); Robert Pennisi, Boca Raton, FL (US)

(73) Assignee: Google Technology Holdings LLC, Mountain View, CA (US)

(*) Notice: Subject to any disclaimer, the term of this patent is extended or adjusted under 35 U.S.C. 154(b) by 2305 days.

(21) Appl. No.: 11/302,358

(22) Filed: Dec. 13, 2005

(65) Prior Publication Data

US 2006/0099465 A1     May 11, 2006

Related U.S. Application Data

(62) Division of application No. 10/256,892, filed on Sep. 28, 2002, now Pat. No. 7,282,283.

(51) Int. Cl.
*H01M 8/04*     (2006.01)
*H01M 8/10*     (2006.01)

(52) U.S. Cl.
CPC ...... *H01M 8/04261* (2013.01); *H01M 8/04388* (2013.01); *H01M 8/04194* (2013.01); *H01M 8/04365* (2013.01); *H01M 8/04798* (2013.01); *H01M 8/1011* (2013.01); *H01M 2008/1095* (2013.01); *Y02E 60/50* (2013.01)
USPC ............ 429/448; 429/443; 429/523; 123/429

(58) Field of Classification Search
USPC ............. 429/24, 448, 429, 443, 523; 123/429
See application file for complete search history.

(56) References Cited

U.S. PATENT DOCUMENTS

| | | | |
|---|---|---|---|
| 5,147,913 A | 9/1992 | MacDiarmid et al. | |
| 5,472,799 A | 12/1995 | Watanabe | |
| 5,672,439 A | 9/1997 | Wilkinson et al. | |
| 6,106,965 A * | 8/2000 | Hirano et al. | 429/30 |

(Continued)

FOREIGN PATENT DOCUMENTS

| KR | 200256121 A | 7/2002 |
|---|---|---|
| KR | 200256135 A | 7/2002 |

OTHER PUBLICATIONS

Anne M Mayes, "Filtration Membranes"; website location: http://web.mit.edu/dmse/mayes/research/membranes.pdf.

(Continued)

*Primary Examiner* — Milton I Cano
*Assistant Examiner* — Stephen Yanchuk
(74) *Attorney, Agent, or Firm* — McDonnell Boehnen Hulbert & Berghoff LLP (57) ABSTRACT

A method of and fuel cell system for limiting an amount of a fuel crossing over a membrane in a fuel cell, the method including determining an appropriate molecular ratio of the fuel and water for a fuel-water mixture 503; and controlling an amount of the fuel-water mixture that is available to an anode side of the membrane 507 in the fuel cell according to an amount of the fuel that will be electro-oxidized by the fuel cell. The fuel cell system includes a fuel cell membrane 103 having an anode layer 107, a cathode layer 109, and an electrolyte layer 111 where the cathode layer is exposed to an oxygen source, and a fuel delivery system 105 including a fuel chamber 119 disposed around and proximate to the anode layer at a side opposite to the electrolyte layer, the fuel delivery system implementing the method above.

6 Claims, 5 Drawing Sheets

(56) References Cited

U.S. PATENT DOCUMENTS

| | | | |
|---|---|---|---|
| 6,127,058 | A | 10/2000 | Pratt et al. |
| 6,387,559 | B1 | 5/2002 | Koripella et al. |
| 6,420,059 | B1 | 7/2002 | Surampudi et al. |
| 6,447,941 | B1 | 9/2002 | Tomimatsu et al. |
| 6,632,553 | B2 * | 10/2003 | Corey et al. .............. 429/22 |
| 6,761,988 | B1 * | 7/2004 | Acker et al. .............. 429/23 |
| 6,824,899 | B2 * | 11/2004 | Acker et al. .............. 429/13 |
| 7,282,283 | B2 | 10/2007 | Kelley et al. |
| 2002/0106547 | A1 * | 8/2002 | Sugawara et al. .............. 429/34 |
| 2003/0082421 | A1 * | 5/2003 | Yonetsu et al. .............. 429/25 |
| 2003/0082435 | A1 * | 5/2003 | Muthuswamy et al. .......... 429/44 |
| 2003/0143444 | A1 * | 7/2003 | Liu et al. .............. 429/19 |
| 2006/0251935 | A1 * | 11/2006 | Barrett et al. .............. 429/22 |

OTHER PUBLICATIONS

So Yeon Kim, et al. "Properties of Electro Responsive Poly (Vinyl Alcohol)/Poly (Acrylic Acid) IPN Hydrogels . . ." Journal of Applied Ploymer Science, vol. 73, 1999 pp. 1675-1683.

Joseph T. Hupp, SonBinh T. Nguyen, and Randall Q. Snurr; "Functional Nanoporous Membranes"; NSF Partnership in Nanotechnoogy Conference; Jan. 29 and 30, 2001.

So Yeon Kim, et al. "Drug Release Behavior of Electrical Responsive Poly (Vinyl Alcohol)/Poly (Acrylic Acid) . . . " Journal of Applied Polymer Science vol. 74 1999 pp. 1752-1761.

Steven Ashley, "Electric Plastics"; website location: http://www.memagazine.org/backissues/april98/features/plastics/plastics.html.

Young Moo Lee, et al. "Synthesis and Swelling Characteristics of pH and Thermo-responsive Interpenetrating . . . " Journal of Applied Polymer Science, vol. 62 1996 pp. 301-311.

Hisao Ichijo, et al. "Separation of Organic Substances With Thermo-Responsive Polymer Hydrogel"; Polymer Gels and Networks 2 (1994) pp. 315-322.

Patent Office of the People'sRepbulic of China, "Notification of the First Office Action", Chinese Appln. No. 03823093.3, Mar. 3, 2006, 9 pages.

Korean Intellectual Property Office, "Notice of Preliminary Rejection", Korean Pat. Appln. No. 10-2005-7005349, Sep. 4, 2006, 3 pages.

United States Patent and Trademark Office, "Non-Final Rejection" for U.S. Appl. No. 10/256,892 dated Oct. 6, 2005, 7 pages.

"Amendment under 37 CFR 1.111" for U.S. Appl. No. 10/256,892 dated Dec. 13, 2005, 9 pages.

United States Patent and Trademark Office, "Final Rejection" for U.S. Appl. No. 10/256,892 dated Dec. 29, 2005, 9 pages.

"Amendment under 37 CFR 1.116" for U.S. Appl. No. 10/256,892 dated Feb. 28, 2006, 9 pages.

United States Patent and Trademark Office, "Advisory Action" for U.S. Appl. No. 10/256,892 dated Mar. 31, 2006, 3 pages.

"Pre-Appeal Brief Request for Review" for U.S. Appl. No. 10/256,892 dated Apr. 28, 2006, 4 pages.

United States Patent and Trademark Office, "Non-Final Rejection" for U.S. Appl. No. 10/256,892 dated Aug. 24, 2006, 7 pages.

"Amendment Under37 CFR 1.111" for U.S. Appl. No. 10/256,892, dated Nov. 21, 2006, 8 pages.

United States Patent and Trademark Office, "Final Rejection" for U.S. Appl. No. 10/256,892 dated Feb. 23, 2007, 7 pages.

"Amendment Under 37 CFR 1.111 [sic]" for U.S. Appl. No. 10/256,892 dated Apr. 23, 2007, 9 pages.

United States Patent and Trademark Office, "Interview Summary" for U.S. Appl. No. 10/256,892 dated Jun. 11, 2007, 2 pages.

United States Patent and Trademark Office, "Notice of Allowance" for U.S. Appl. No. 10/256,892 dated Jul. 10, 2007, 3 pages.

Patent Cooperation Treaty, "PCT Search Report and Written Opinion of the International Searching Authority" for International Application No. PCT/US03/30643, Mar. 18, 2004, 3 pages.

* cited by examiner

METHOD AND DEVICE FOR LIMITING CROSSOVER IN FUEL CELL SYSTEMS

This application is a Divisional of application Ser. No. 10/256,892 filed Sep. 28, 2002 entitled "Method and Device for Limiting Crossover in Fuel Cell Systems" now U.S. Pat. No. 7,282,283.

FIELD OF THE INVENTION

The present invention relates generally to fuel cells and, more particularly, to methods and apparatus within such fuel cells to limit or reduce fuel crossover.

BACKGROUND OF THE INVENTION

Fuel cells are electrochemical cells in which a free energy change resulting from a fuel oxidation reaction is converted into electrical energy. A conventional fuel cell consists of a fuel electrode (anode) and an oxidant electrode (cathode), separated by an ion-conducting electrolyte (electrolyte). The assembly of anode, cathode and electrolyte are referred to as a membrane electrode assembly. The electrodes are coupled electrically to a load (such as an electronic circuit) by electrical conductors. In the conductor, electrical current is transported by the flow of electrons, whereas in the electrolyte it is transported by the flow of ions, such as the hydrogen ion ($H^+$) in acid electrolytes, or the hydroxyl ion ($OH^-$) in alkaline electrolytes. Hydrogen is often used as the fuel for producing the electricity and can be processed from methanol, natural gas, petroleum, or stored as pure hydrogen. Direct methanol fuel cells (DMFCs) utilize methanol, in a gaseous or liquid form as the fuel, thus eliminating the need for reforming operations. In theory, any substance capable of chemical oxidation that can be supplied continuously (as a gas or fluid) can be oxidized galvanically as the fuel at the anode of a fuel cell. Similarly, the oxidant can be any material that can be reduced at a sufficient rate. At the fuel cell cathode the most common oxidant is gaseous oxygen, which is readily and economically available from the atmosphere for fuel cells used in terrestrial applications.

In liquid feed electrochemical fuel cells, one or more of the reactants is introduced to the electro catalyst in a liquid form. Examples of electrochemical fuel cells that can be operated with a liquid fuel feed are those employing a lower alcohol, most commonly methanol, as the fuel supplied to the anode (so-called liquid feed direct methanol fuel cells) and oxygen to the cathode. In fuel cells of this type the reaction at the anode produces protons, as in the hydrogen/oxygen fuel cell described above, however the protons (along with carbon dioxide) arise from the oxidation of methanol. An electro catalyst promotes the methanol oxidation at the anode. The methanol may alternatively be supplied to the anode as vapor, but it is generally advantageous to supply the methanol to the anode as a liquid, preferably as an aqueous solution, such as 2% methanol. In some situations, an acidic aqueous methanol solution is the preferred feed to the anode.

The anode and cathode reactions in a direct methanol fuel cell are shown in the following equations:

Anode reaction: $CH_3OH+H_2O \rightarrow 6H^+ + CO_2 + 6e^-$

Cathode reaction: $\tfrac{3}{2}O_2 + 6H^+ + 6e^- \rightarrow 3H_2O$

Overall reaction: $CH_3OH + \tfrac{3}{2}O_2 \rightarrow CO_2 + 2H_2O$

The protons formed at the anode electro catalyst migrate through the ion-exchange membrane from the anode to the cathode, and at the cathode electro catalyst layer, the oxidant reacts with the protons to form water as a byproduct. The overall reaction that takes place in the fuel cell is the sum of the anode and cathode reactions, with part of the free energy of reaction released directly as electrical energy. As long as methanol and water and oxygen are fed to the fuel cell, the flow of electric current will be sustained by electron flow in the external circuit and ionic flow in the electrolyte.

In electrochemical fuel cells employing liquid or solid electrolytes and gaseous or liquid reactant streams, crossover of a reactant from one electrode to the other is generally undesirable. Reactant crossover may occur if the electrolyte is permeable to the reactant, that is, some of a reactant introduced at a first electrode of the fuel cell passes through the electrolyte to the second electrode, instead of reacting at the first electrode. Reactant crossover typically causes a decrease in both reactant utilization efficiency and fuel cell performance defined as the voltage output from the cell at a given current density or vice versa. For example, ion-exchange membranes typically employed in solid polymer electrochemical fuel cells are permeable to methanol and thus methanol that contacts the membrane prior to participating in the oxidation reaction can cross over to the cathode side.

Diffusion of methanol fuel from the anode to the cathode (fuel crossover) leads to a reduction in fuel utilization efficiency and to performance losses. Fuel utilization efficiency losses arise from methanol diffusion away from the anode because some of the methanol that would otherwise participate in the oxidation reaction at the anode and supply electrons to do work through the external circuit is lost. Methanol arriving at the cathode may be lost through vaporization into the oxidant stream, or may be oxidized at the cathode electro catalyst, consuming oxidant, as follows:

$CH_3OH + \tfrac{3}{2}O_2 \rightarrow CO_2 + 2H_2O$

The oxidation of methanol at the cathode reduces the concentration of oxygen at the electro catalyst and may affect access of the oxidant to the electro catalyst (mass transport issues). Further, depending upon the nature of the cathode electro catalyst and the oxidant supply, the electro catalyst may be poisoned by methanol oxidation products, or sintered by the methanol oxidation reaction. Conventional methods for reducing crossover have involved mixing excess water with the fuel. However, excess water may lead to reduced fuel efficiency and higher costs associated with a water supply.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE PREFERRED EMBODIMENT

In overview, the present disclosure concerns fuel cell systems and methods therein for limiting a phenomenon commonly referred to as crossover or fuel crossover that occurs in fuel cells such as a direct methanol fuel cells or DMFCs as well as other fuel cells utilizing various fuels, often referred to as organic fuels. Crossover is the phenomenon where the fuel, for example methanol, migrates directly through the fuel cell membrane from the anode to the cathode through the electrolyte. This result in wasting fuel and can poison or render useless the cell itself. Crossover is a serious problem particularly for cells that are supplying electrical energy to a variable load. Even for a known load, present solutions for the crossover problem require that a large amount of water be available for forming a low percentage fuel-water mixture or alternatively that processes, which may be complex and expensive, are utilized to recover and reuse water from the cathode side. At some level the problem boils down to having enough but just enough fuel available at the anode to support the electro-oxidation reaction required for the immediate load on the cell.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive control functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Figure 1:
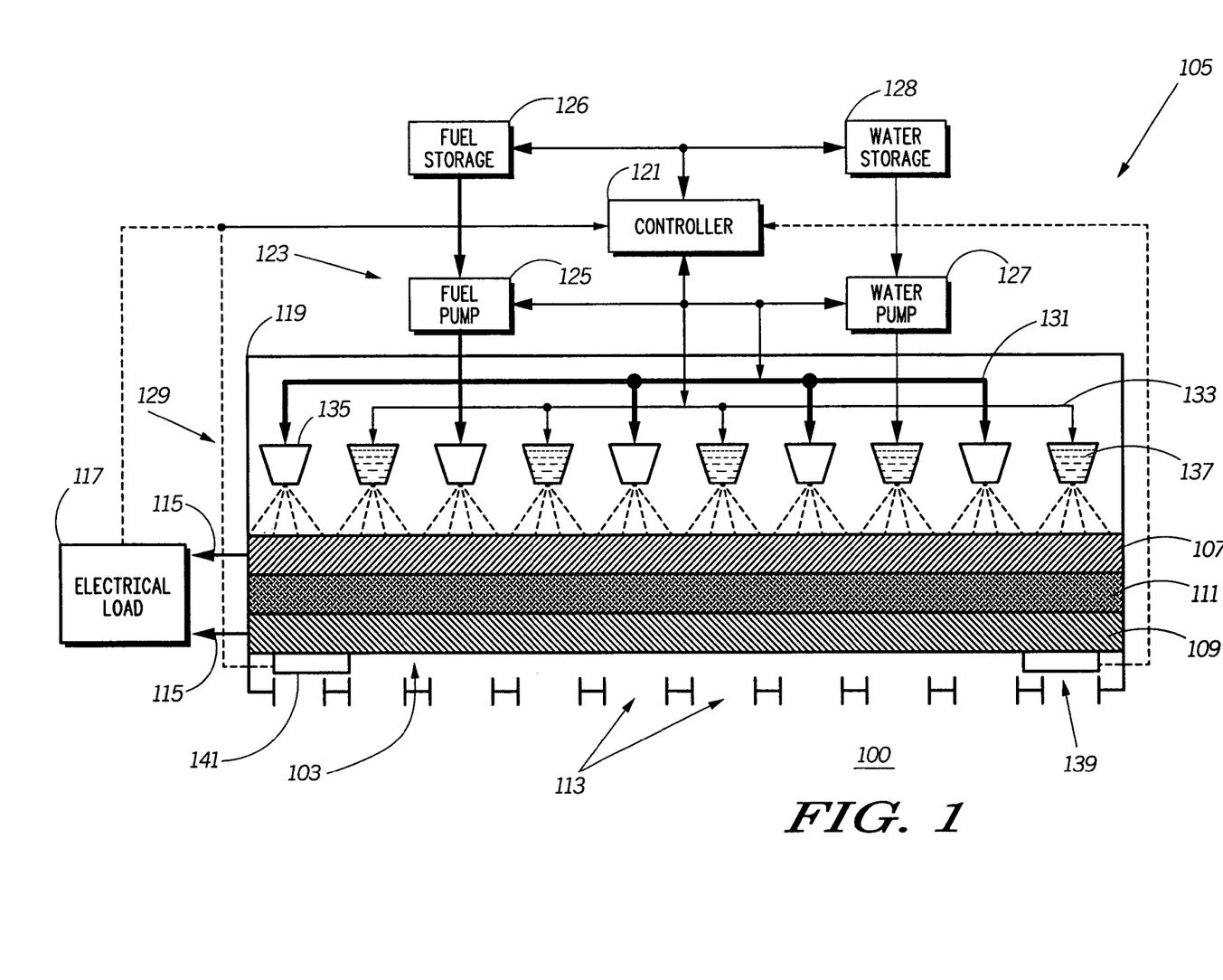
FIG. 1 is a functional sectional diagram of a preferred embodiment of a fuel cell system for limiting fuel crossover in accordance with the present invention.

Referring to FIG. 1, a functional sectional diagram of a preferred embodiment of a fuel cell system 100 for limiting fuel crossover will be discussed and described. It is understood that FIG. 1 is not intended to demonstrate relative dimensions or a detailed structure but rather a functional structure. Generally fuel cell structures are reasonably well known and can be found described, for example, in U.S. Pat. No. 6,127,058 by Pratt et al., titled PLANER FUEL CELL and U.S. Pat. No. 6,387,559 by Koripella et al., titled DIRECT METHANOL FUEL CELL SYSTEM AND METHOD OF FABRICATION in addition to many others. The structures normally are comprised of a base arrangement on which the fuel cell membrane is secured with an anode portion in proximity to a fuel source and a cathode portion exposed to an oxygen source with electrical conductors available from the anode and cathode. The details of the structure will vary dramatically in size and complexity depending on the end application. For example the structure for a trickle charger for a small battery and a power plant for a car will be radically different although it is expected that either could utilized the concepts and principles discussed and disclosed herein.

FIG. 1 depicts a fuel cell system that is arranged and constructed to limit an amount of fuel that is not electro-oxidized or that is wasted by virtue of crossover in the fuel cell. The fuel cell system includes a fuel cell membrane 103 and a fuel delivery system 105. The fuel cell membrane 103 has an anode side or layer 107, a cathode side or layer 109, and an electrolyte layer 111 disposed between the anode layer and the cathode layer. The cathode layer or one side thereof is exposed to an oxygen source such as the atmosphere via a plurality of air-flow channels 113. The anode layer and cathode layer are coupled to, via respective conductors 115, to an electrical load 117. Different voltage levels and current levels are obtained by having multiple membranes or cells in series or parallel or by varying the area of the membrane, or using a voltage converter between the fuel cell and the load for example.

A typical membrane or membrane electrode assembly for a DMFC, as known, is an electrode comprised of gold, platinum, palladium, nickel or the like, including a carbon cloth collectively acting as the anode, a protonically conducting electrolyte layer comprised of Nafion™ or a Nafion™ like material that somewhat limits the crossover of fuel, and a second carbon cloth and electrode comprised as above collectively acting as the cathode. Additionally the anode and cathode will preferably include a current collecting layer comprised of a conductive material and this will be coupled to the conductors 115.

The fuel delivery system 105 includes a fuel chamber 119 disposed around and proximate to the anode layer at a side of the anode layer opposite to the electrolyte layer. This chamber in many structures may be part of a frame or case or package for the fuel cell. The fuel delivery system 105 is for determining an appropriate molecular ratio of the fuel and water for a fuel-water mixture; and controlling an amount of the fuel-water mixture, either directly or indirectly via the constituents, that is available to the anode layer of the fuel cell membrane according to an amount of the fuel that is being or will be electro-oxidized by the fuel cell, thereby limiting fuel crossover and fuel that is not electro-oxidized in the fuel cell. In the end, this is accomplished by limiting the amount of fuel, such as methanol, that is available to the anode layer or side to just enough to support the chemical reactions needed to supply the load or the maximum level of such reactions given other constraints, such as area of the membrane that is exposed to the fuel. Too little and the load may not be properly supplied and too much and there will be excess fuel crossing over or through the membrane. Inevitably there will be some fuel crossing over so the task of the fuel delivery system is to avoid or limit the degree or amount of such crossover in order to avoid wasting fuel or poisoning the cathode while supplying the demand of the load.

The fuel cell system or fuel delivery system, preferably further includes a controller 121, such as microprocessor based processing unit executing software as generally known, that is coupled to the electrical load and arranged, via known techniques, for assessing or sensing or measuring a demand of or power consumption or rate of energy consumption for the electrical load. This demand will correspond to the amount of the fuel that will be or will need to be electro-oxidized by the fuel cell in order to support the demand of the load. The controller will determine the appropriate molecular ratio of the fuel and the water for the fuel-water mixture in accordance with this demand. Note at lower demands the percentage of fuel in the mixture will be lower than at higher demands. The ideal ratio of methanol to water in the fuel-water mixture is one molecule of water for every molecule of methanol. Stated another way in more practical units, the goal is to have only one mole of water per mole of methanol so that the molar ratio of methanol to water is 1. But in reality, the ratio is less than 1. In prior art fuel cells, the ratio could be as low as 0.1 or lower due to the high levels of dilution of methanol with water. When a system according to the principles and concepts herein operates at high load levels, near the peak capacity of the cell, the molar ratio should be as close to 1 as possible. In this high load situation, the methanol and water molecule is more likely to be consumed at the anode before they can crossover. On the other hand, when the system load is very low, then the molar ratio can be lower than one. Even in the low load case, it is preferable to keep the molar ratio close to 1, but reduce the overall quantity of the mixture introduced into the fuel chamber, to account for lower demand for methanol and water. Alternatively or additionally, having determined the demand of the load, the controller will control the amount of the fuel-water mixture that is available to the anode side or layer of the membrane in the fuel cell in accordance with the demand.

The controller 121 controls the amount of the fuel-water mixture or the ratio of the mixture by controlling a pumping apparatus 123, preferably including a fuel pump 125 supplied from a fuel storage unit 126 and a water pump 127 supplied by a water storage unit 128 that is coupled to and responsive to the controller and operable for supplying one of the fuel and the water to respective ones of a plurality of jet nozzles 129. The fuel is supplied via control lines including fuel lines 131 and the water is supplied via control lines including water lines 133 to one or a plurality of fuel nozzles 135 or jet nozzles and one or a plurality of water nozzles 137 or jet nozzles. Note that in an embodiment not specifically depicted the fuel and water can be premixed in a controlled and variable fashion using known mixing techniques and then the amount of the resultant fuel-water mixture that is supplied to the plurality of jet nozzles controlled to meet similar objectives. While this would represent a marked improvement oven known techniques it is expected that the time delay in adjusting the mixture ratio would be longer than the fuel cell system shown in FIG. 1 using respective fuel and water jet nozzles. The fuel delivery system uses the plurality of jet nozzles for spraying fuel and water on the anode, where spraying fuel and spraying water on the anode side is controllably done in proportions to obtain the appropriate molecular ratio using respective fuel and water jet nozzles or in the alternative embodiment, using the mixture, spraying the fuel-water mixture on the anode side using one or more jet nozzles provides the control over the amount of the mixture available to the anode layer or side.

The fuel pump and water pump are known and available and will vary in size, cost, an complexity according to the power levels required of the fuel cell systems. For example, a small battery charger versus a power plant for an automobile would require dramatically different pumping apparatus. The fuel and water nozzles are generally known and can use fixed nozzles of a predetermined size or controlled (on-off) nozzles of a known size. With fixed nozzles, such as those found in fuel injector systems for combustion engines, the amount of fuel, water, or mixture is controlled by varying the volume, thus pressure, of each supplied by the respective pumping apparatus. With controllable nozzles where the nozzles may be turned on or off, via the respective control lines (depicted together with the fuel lines) from the controller, the on off duty cycle can be adjusted or controlled from the controller in order to adjust the ratios of fuel and water as well as total amount of each available to the anode layer or side. The nozzles or jet nozzles can also use known technologies, such as the approach used in ink jet printers where the jet nozzles normally are controlled using either piezoelectric or thermal principles.

The fuel cell system above or fuel delivery system can advantageously use the demand of the electrical load as assessed or measured or determined by the controller as feedback upon which to base or control the spraying the fuel and water on the anode side. In one embodiment the fuel delivery system further includes one or more fuel sensors 139 (one depicted) disposed proximate to the cathode layer for sensing an amount of fuel at the cathode layer within a region of the sensor or one or more water sensors 141 (one depicted) disposed proximate to the cathode layer for sensing an amount of water at the cathode layer within a region of the sensor. The fuel delivery system by providing signals corresponding to the amount of fuel or water from these respective one or more fuel and water sensors to the controller uses these signals via the controller to control, one or both molecular mixture and amount, the spraying the fuel and water on the anode side. In the embodiment that uses individually controlled jet nozzles coupled to and thus addressable by the controller, the controller can independently control spraying the fuel and water or the anode side or layer in each of a plurality of regions. With sufficient numbers and types of sensors namely, fuel, water and temperature (not depicted) appropriately deployed, for example region by regions or a reasonable sampling thereof, the controller can independently control the spraying in one or more of the plurality of regions responsive to determining for one or more of the plurality of regions fuel at a cathode layer of the membrane, water at the cathode layer of the membrane, and an operating temperature of the membrane in a region. This information will allow for more precise control of the fuel cell and the amount of fuel that is being made available and properly oxidized by the cell. Small or miniaturized versions of fuel or methanol, water, and temperature sensors are known. Often the fuel sensor is a micro miniaturized fuel cell and the electricity provided is an indication of the amount of fuel available.

Figure 2:
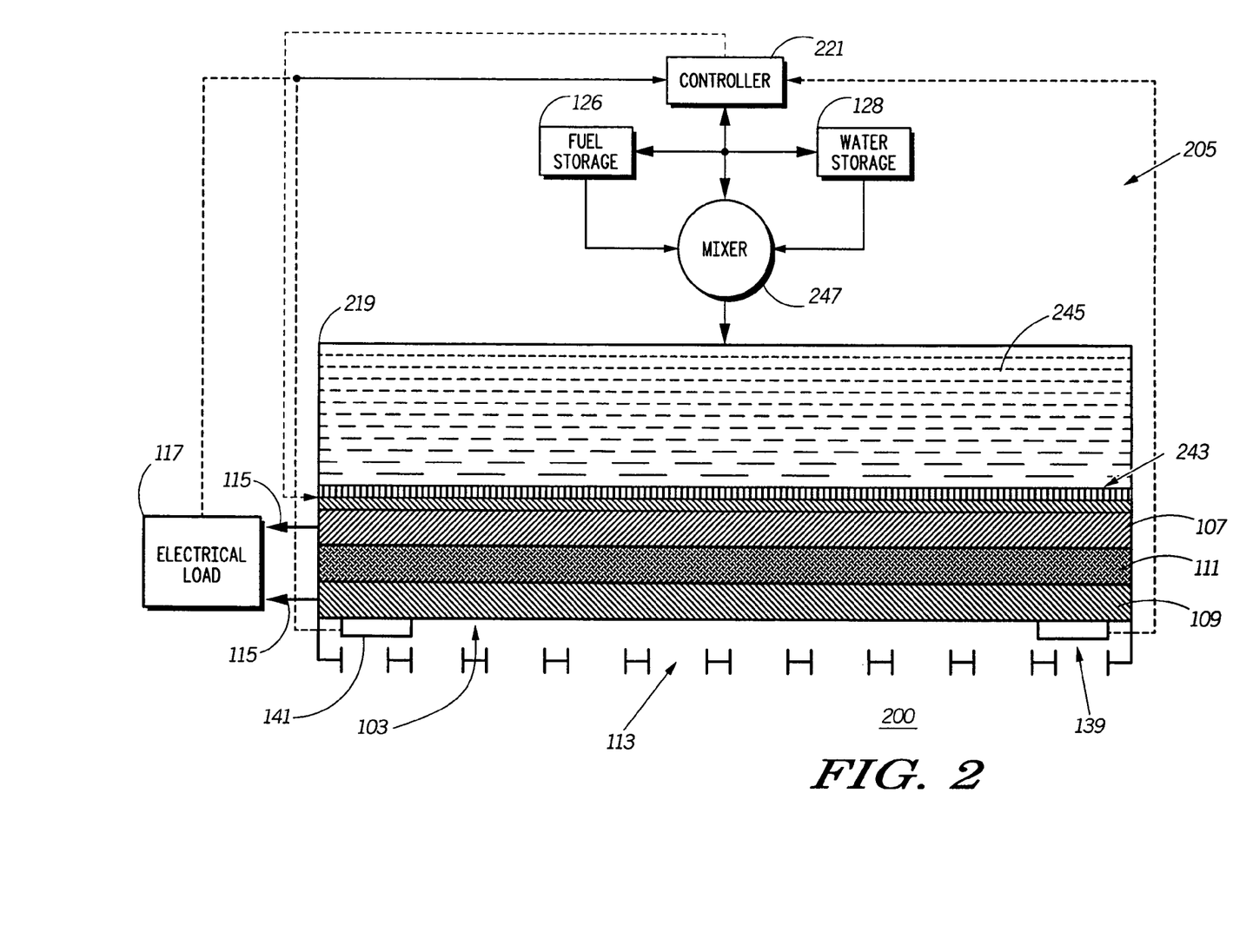
FIG. 2 is a functional sectional diagram of another embodiment of a fuel cell system for limiting fuel crossover in accordance with the present invention.

Referring to FIG. 2 a functional sectional diagram of another embodiment of a fuel cell system for limiting fuel crossover will be discussed and described. As in FIG. 1, FIG. 2 shows a fuel cell system that is arranged and constructed to limit an amount of a fuel that is wasted or not electro-oxidized in a fuel cell principally because it crosses over the membrane in the cell. The fuel cell system of FIG. 2 includes the fuel cell membrane 103 with an anode layer 107, a cathode layer 109, and an electrolyte layer 111 disposed between the anode layer and the cathode layer, where the cathode layer is exposed to an oxygen source, via air flow channels 113 and the anode layer and the cathode layer are arranged to be coupled via conductors 115 to an electrical load 117, all as discussed in detail above with reference to FIG. 1.

Further included is a fuel delivery system 205 including a fuel chamber 219 disposed around and proximate to the anode layer at a side opposite to the electrolyte layer, where the fuel delivery system is operable for determining an appropriate molecular ratio of fuel, such as methanol, from a fuel storage unit 126 and water from a water storage unit 128 for a fuel-water mixture 245 within the fuel chamber 219; and controlling an amount of the fuel-water mixture that is available to the anode layer of the fuel cell membrane according to an amount of the fuel that will be electro-oxidized by the fuel cell thereby limiting fuel crossover and fuel that is not electro-oxidized in the fuel cell.

Further included in the fuel delivery system 205 is a porous membrane 243 having limited permeability for the fuel and water, where the porous membrane is disposed between the anode layer of the membrane in the fuel cell and the fuel and water and proximate to the anode layer of the membrane in the fuel cell. The porous membrane 243 is selected and arranged for controlling the amount of the fuel-water mixture that is available to the anode layer of the membrane in the fuel cell by allowing an amount of the fuel and the water to cross to the anode layer that corresponds to the appropriate molecular ratio and that provides the amount of the fuel that will be electro-oxidized by the fuel cell. Preferably the porous membrane 243 is a porous membrane with variable permeability disposed between the anode layer and the fuel-water mixture. The porous membrane will be at least one and possibly a plurality of functional layers with different functional layers having a permeability that varies with one or more controlling variables.

For example, the porous membrane can have a variable permeability that changes according to a temperature of the membrane and thus, by virtue of the disposition proximate to the anode layer of the fuel cell, according to the temperature of the fuel cell membrane thereby controlling the amount of the fuel-water mixture 245 available to the anode layer.

The fuel cell system of FIG. 2 shows the fuel delivery system includes a controller 221 coupled to a mixer 247 for changing or controlling the relative molecular ratio of the fuel-water mixture. The controller 221 is also coupled to and arranged to assess a demand of the electrical load in a manner similar to the approach used in FIG. 1 and is provided, as in FIG. 1, one or a plurality of signals from fuel sensors 139 and water sensors 141. The controller 221 is further coupled electrically to the variable permeability membrane 243 and operable for changing the variable permeability of the porous membrane according to one or more of; the assessed demand of the electrical load, one or more signals corresponding to an amount of fuel detected by one or more of the fuel sensors 139 disposed at the cathode layer of the membrane in the fuel cell, or one or more signals corresponding to an amount of water detected by one or more of the water sensors 141 disposed at the cathode layer of the membrane in the fuel cell, thereby controlling the amount of the fuel-water mixture, and thus fuel, available to the anode side or controlling the ratio of the fuel-water mixture, with, as noted earlier, higher demands of the load indicating richer fuel content or mixtures.

The porous membranes applicable to or available for use in the FIG. 2 (and FIG. 3 see below) system include, those where the permeability changes either due to a change in porosity and/or thickness (path length) of membranes due to application of an electrical potential. The membranes and various techniques use a combination of a gel structure in which different materials are embedded to control the swelling rate, the swelling response, etc. The permeability of the membrane changes with the application of a voltage. Many of the membranes suitable for this purpose exhibit swelling behavior in response to application of an electrical excitation. The swelling behavior causes an increase in thickness of the membrane and thus increased path length that affects the permeability of methanol through the membrane. The swelling is reversible with removal of the electrical excitation. In one membrane, pores are initiated in the electrically responsive membrane. In this case, the swelling behavior causes the pores to enlarge or contract thereby changing the permeability.

A preferred membrane with variable permeability is engineered porous-fiber material having electrically controlled porosity that uses polyaniline. Generally this class of materials having polyaniline, demonstrate sensitivity to an electrical excitation when disposed in a cross-linked polymer form. The cross-linked polymer is made into a gel form using a suitable liquid medium such as 1-methyl-2-pyrrolidinone. The resulting gel typically comprises a cross-linked polymer network that will swell or expand through application of electrical voltage. Given the wide variety of polymers and liquids known in the art, a wide variety of gels with suitable properties may be prepared. U.S. Pat. No. 5,147,913 issued Sep. 15, 1992, titled CROSS-LINKED POLYMERS DERIVED FROM POLYANILINE AND GELS COMPRISING THE SAME, by MacDiarmid et al. describes a process of making polyaniline in linear polymer form, initiating cross-linking and forming a gel using appropriate liquid medium. It also described the process of forming these kinds of material in different shapes and forms such as films, fibers and composites thereof.

Another class of materials that exhibit electrically controlled swelling/permeability behavior are interpenetrating polymer networks (IPN) composed of poly(vinyl alcohol) (PVA) and poly(acrylic acid) (PAAc) in gel form are being discussed in the literature and studied in the laboratory. These materials or derivatives thereof are expected to be suitable for the applications of FIG. 2 and FIG. 3 in due course.

Figure 3:
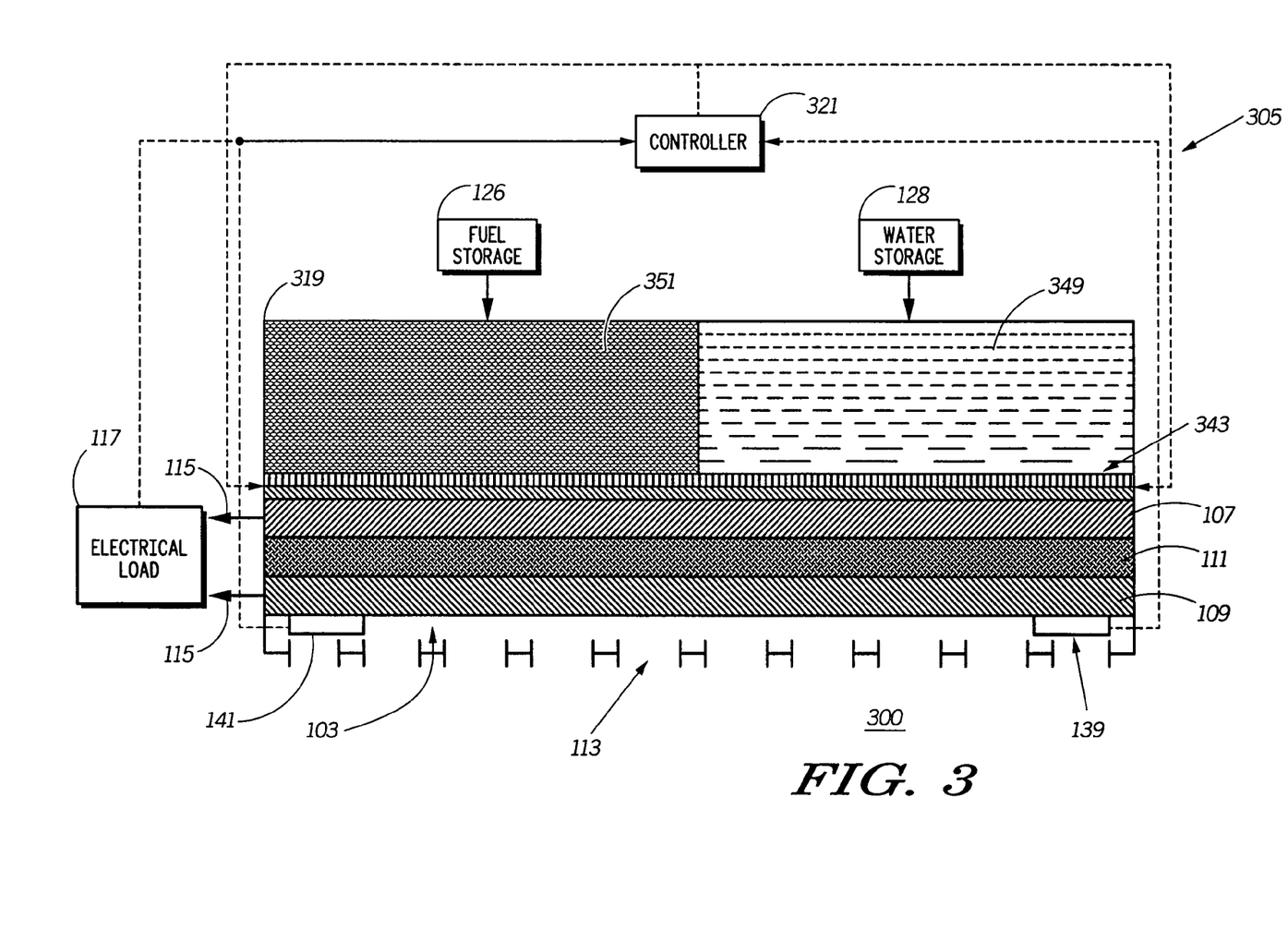
FIG. 3 is a functional sectional diagram of a further embodiment of a fuel cell system for limiting fuel crossover in accordance with the present invention.

Referring to FIG. 3 a functional sectional diagram of a further embodiment of a fuel cell system for limiting fuel crossover will be discussed and described. FIG. 3 shows a fuel cell system arranged and constructed to limit an amount of a fuel that is not electro-oxidized in the fuel cell. The fuel cell system comprises a fuel cell membrane 103 having an anode layer 107, a cathode layer 109, and an electrolyte layer 111 disposed between the anode layer and the cathode layer, where the cathode layer is exposed to an oxygen source via air flow channels, and the anode layer and the cathode layer are arranged to be coupled via conductors 115 to an electrical load 117 as discussed with reference to FIG. 1. Further included is a fuel delivery system 305 including a fuel chamber 319 disposed around and proximate to the anode layer 107 at a side opposite the electrolyte layer, the fuel chamber including one or more fuel compartments 351 coupled to and supplied by a fuel storage unit 126 and one or more water compartments coupled to and supplied by a water storage unit 128. The fuel delivery system is operable for determining an appropriate molecular ratio of the fuel and water for a fuel-water mixture and controlling an amount of the fuel-water mixture that is available to the anode layer of the fuel cell membrane according to an amount of the fuel that will be electro-oxidized by the fuel cell thereby limiting fuel crossover and fuel that is not electro-oxidized in the fuel cell.

Further included in the fuel delivery system 305 is a porous membrane 343 having limited permeability for the fuel and water, where the porous membrane is disposed between the anode layer of the membrane in the fuel cell and the one or more fuel compartments 351, the interface there between defining one or more fuel regions and similarly between the one or more water compartments 349 with interfaces there between defining water regions and proximate to the anode layer of the membrane in the fuel cell. The porous membrane 343 is selected and arranged for controlling the amount of the fuel-water mixture, specifically the amount of fuel and the amount of water for a fuel-water mixture, that is available to the anode layer of the membrane in the fuel cell by allowing an amount of the fuel and the water to cross to the anode layer that corresponds to the appropriate molecular ratio and that provides the amount of the fuel that will be electro-oxidized by the fuel cell.

Preferably the porous membrane 343 is a porous membrane with variable permeability disposed between the anode layer and the fuel compartments and water compartments. The porous membrane will be at least one and possibly a plurality of functional layers with different functional layers having a permeability that varies with one or more controlling variables, such as temperature, voltage or current, pH, or the like. Further the porous membrane will likely have different permeability properties and control sensitivities depending on whether it lies between a fuel compartment and the anode layer or between a water compartment and the anode. For example, the temperature sensitive portion or layer of the porous membrane will preferably reduce the amount of fuel available to the anode when temperatures exceed a certain level whereas the amount of water can be increased.

The fuel cell system of FIG. 3 includes a controller 321 coupled to and arranged to assess a demand of the electrical load in a manner similar to the approach used in FIG. 1 and FIG. 2 and is provided, as in FIGS. 1 and 2, with one or a plurality of signals from fuel sensors 139 and water sensors 141. The controller 221 is further coupled electrically to the variable permeability membrane 343 and operable for changing the variable permeability of the porous membrane according to one or more of; the assessed demand of the electrical load, one or more signals corresponding to an amount of fuel detected by one or more of the fuel sensors 139 disposed at the cathode layer of the membrane in the fuel cell, or one or more signals corresponding to an amount of water detected by one or more of the water sensors 141 disposed at the cathode layer of the membrane in the fuel cell, thereby controlling the amount of the fuel-water mixture, and thus fuel, available to the anode side or controlling the ratio of the fuel-water mixture, with, as noted earlier, higher demands of the load indicating richer fuel content or mixtures. Note that the controller is independently coupled to the porous membrane for the fuel regions and the water regions and preferably independently controls the respective variable permeability membrane or portion thereof for each region. By independently controlling the variable permeability of the porous membrane according, for example, to a temperature of the fuel cell, the controller controls the amount of fuel and water and thus the fuel-water mixture available to the anode layer. Note that mixing of the fuel and water occurs at the anode layer and thus the area of the respective regions will be limited to that where sufficient mixing of the constituent ingredients can be accomplished.

Figure 4:
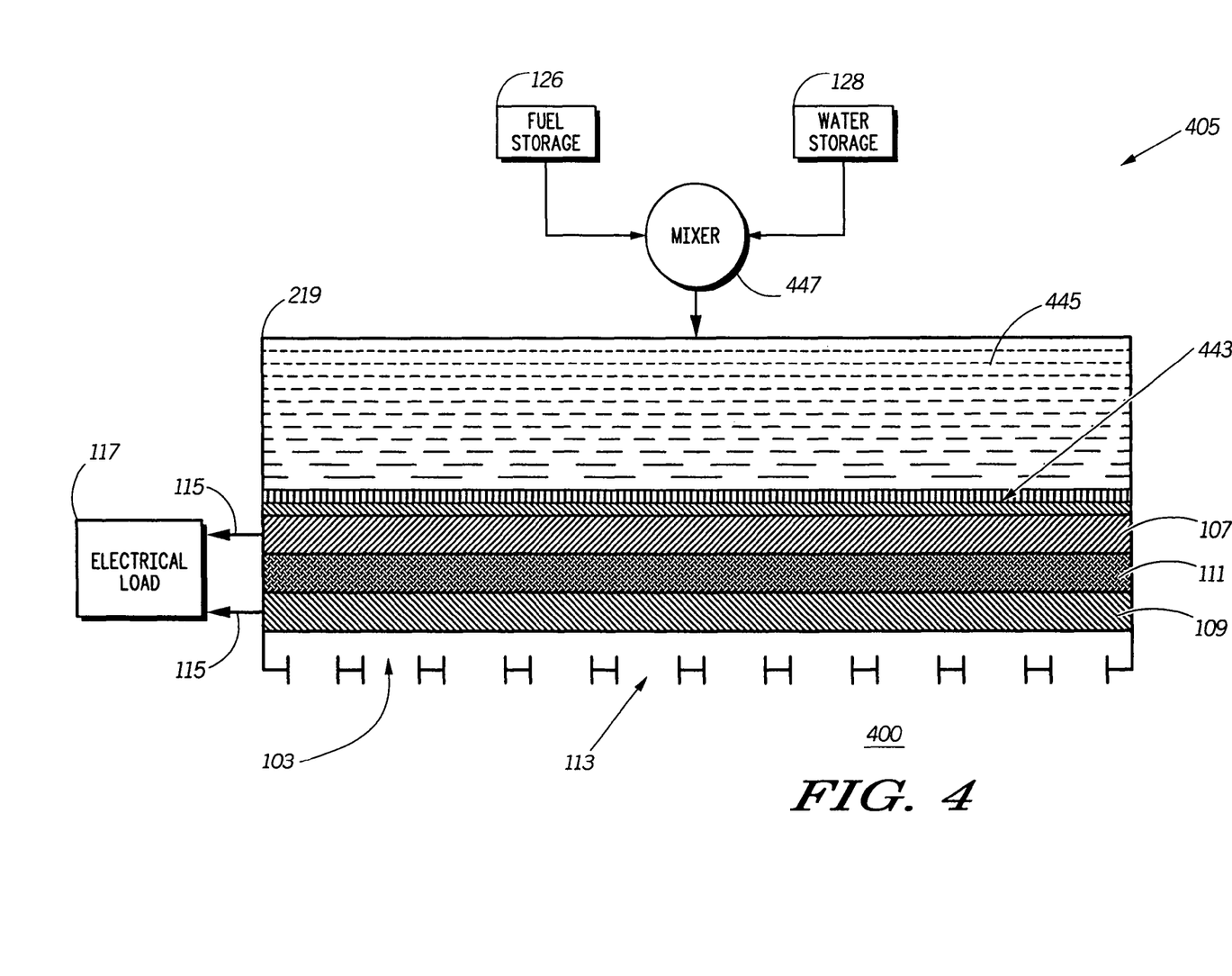
FIG. 4 is a functional sectional diagram of yet another embodiment of a fuel cell system for limiting fuel crossover in accordance with the present invention.

Referring to FIG. 4 a functional sectional diagram of yet another embodiment of a fuel cell system for limiting fuel crossover will be discussed and described. The fuel cell system is arranged and constructed to limit an amount of fuel that is not electro-oxidized and includes the fuel cell membrane 103, with anode 107, cathode 109, and electrolyte layer 111 arranged and disposed with air flow channels 113 and coupled via conductors 115 to a load 117 as in FIG. 1-3. Further included is a fuel delivery system 405 that includes the fuel chamber 219 as in FIG. 2, where the chamber is supplied with a fuel-water mixture 445 by a mixer 447 from a fuel storage unit 126 and water storage unit 128. Here the appropriate molecular ratio of the fuel and water is predetermined and will vary with the application. This particular fuel cell system may be most practical for use in relatively constant load applications such as a charger for a battery system and the like where the molecular ratio need not be changed from the predetermined value.

This fuel cell system controls the amount of the fuel-water mixture that is available to the anode layer of the fuel cell membrane in accordance with the fuel that is expected to be electro-oxidized by the fuel cell, thus limiting fuel crossover and fuel waste. A porous membrane 443 having fixed permeability that is disposed between the anode layer and the fuel-water mixture accomplishes this. Note that in a variation of this system a porous membrane 443 having a permeability that varies with temperature can be used and utilized to vary the permeability and thus amount of the fuel-water mixture that is available to the anode layer on a local area by local area basis according to the temperature of the fuel cell.

Porous membranes having variable permeability or porosity, that is a function of temperature are known as thermo responsive materials and becoming more widely available. One class of materials that represent porous membranes with variable permeability is a polymeric material that varies its porosity as a function of temperature. The pores in these membranes grow or shrink in size as temperature in the local area of the membrane decreases or increases. When temperature at a local area of the material increases above a threshold, the porosity of the variable porosity or permeability membrane adjacent to the active surface decreases over this local area, thus reducing the amount of reactant (fuel or fuel-water mixture) supplied to the active surface of the MEA. A drop in temperature at these local areas opens the pores of the membrane back to their normal size. This regulation of reactant flow is fully reversible, passive and self-regulating. The threshold level, rate, and extent of pore expansion or contraction can be custom tailored to each combination of reactants by appropriate selection of variable porosity (VP) polymer materials. The VP layer is micro or nano porous allowing the reactants to pass through it.

Typical thermo responsive materials used that are suited for use in embodiments according to principles and concepts discussed and disclosed herein have an open pore structure and are specifically designed to effectively transport reactants to the fuel cell active area. Thermo responsive membranes that are suitable for use in the various embodiments discussed and described above can be realized in a number of ways. Preferably, the membrane is composed of a core layer made of fibrous materials exhibiting a positive coefficient of thermal expansion (PCTE—smaller pores for higher temperatures), distributed in an ordered or random fashion to create a membrane that is micro or nano porous.

When temperature at a local area of the membrane increases above a threshold, the PCTE fibrous materials of the core layer in the local area expand in size and move closer to each other thus reducing the size of pores between them. This decrease in porosity reduces the amount of reactant supplied to the active surface of the MEA. A drop in temperature at these local areas causes the fibrous PCTE material of the core layer in the local area to contract back to their normal size thus brining the pores back to their normal size.

An additional class of materials that is also well suited for a fuel cell embodiment are thermo responsive polymers that exhibit positive swelling behavior with increase in temperature. One such material is described in the paper "Synthesis and Swelling Characteristics of pH and Thermoresponsive Interpenetrating Polymer Network Hydrogel Composed of Poly(vinyl alcohol) and Poly(acrylic acid), authored by Young Moo Lee, et. al. (Journal of Applied Polymer Science 1996, Vol. 62, 301-311). In addition to the thermo responsive materials exhibiting positive swelling, thermo responsive polymers with negative swelling can also be fashioned and used in the embodiments above.

When using materials with negative swelling behavior, the boundary condition of the material layer should be such as to allow the pores to shrink with an increase in temperature. A combination of materials exhibiting positive and negative swelling can also be used to realize the desired variable porosity behavior for applications such as depicted in FIGS. 2 and 3.

Additional materials that exhibit the required variable porosity behavior are described in "Separation of Organic Substances with Thermo responsive Polymer Hydrogel" by Hisao Ichijo, et. al. (Polymer Gels and Networks 2, 1994, 315-322 Elsevier Science Limited), and "Novel Thin Film with Cylindrical Nanopores That Open and Close Depending on Temperature: First Successful Synthesis", authored by Masaru Yoshida, et. al. (Macromolecules 1996, 29, 8987-8989). The core layer is formed by disposing a thermo responsive gel using conventional gel coating techniques, by embedding them in a mesh of other PCTE material or by randomly distributing a fibrous form of the thermo responsive material.

Note that a thermo responsive membrane with the proper thermo sensitivity can be utilized as the electrically controllable porous membrane with permeability that varies with an electrical signal, provided that suitable low power resistive heating elements are provided within the GDL. This would be suitable for use in the FIGS. 2 and 3 embodiments discussed above.

Figure 5:
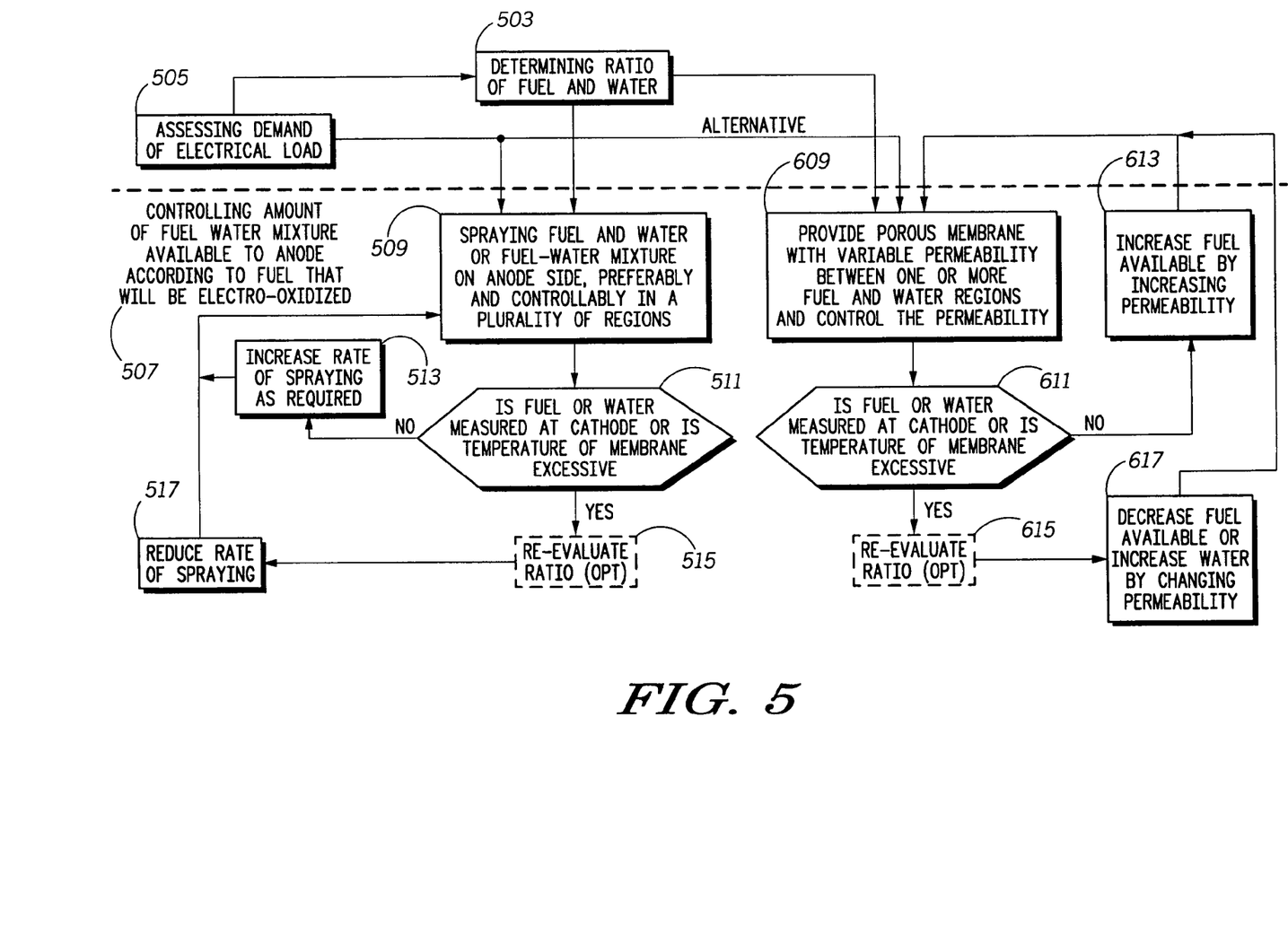
FIG. 5 shows a flow chart of a preferred method embodiment of limiting an amount of a fuel crossing over a membrane in a fuel cell in accordance with the present invention.

Referring to FIG. 5, a flow chart of a preferred method embodiment of limiting an amount of a fuel crossing over a membrane in a fuel cell will be discussed and described. This discussion will be somewhat in the nature of a summary as most of the concepts and principles that may be advantageously utilized to control a fuel cell have been reviewed above. The method shown is suitable for implementation in one or more of the fuel cell systems of FIG. 1 through FIG. 4. The flow chart of FIG. 5 depicts a method of limiting an amount of a fuel crossing over a membrane in a fuel cell and begins with determining an appropriate molecular ratio of the fuel and water for a fuel-water mixture 503. This depends on or factors in or is done in accordance with the results of assessing a demand of an electrical load 505 where the demand corresponds to the amount of the fuel that will be electro-oxidized by the fuel cell. Then the process 507 depicts controlling an amount of the fuel-water mixture that is available to an anode side of the membrane in the fuel cell according to an amount of the fuel that will be electro-oxidized by the fuel cell, where this depends on or is done in accordance with the assessment from 505. Note that in a passive system with more or less fixed control this demand may be predetermined or infrequently revisited.

One method of effecting this control using spraying is shown by the processes 509-517 and an alternative using a porous membrane is shown by the processes 609-617. First considering the process of 509-517, controlling the amount of the fuel-water mixture that is available to the anode side of the membrane is done, preferably responsive to the assessment from 505, by spraying fuel and water or the fuel-water mixture on the anode side 509. This spraying fuel and water on the anode side is done in proportions to obtain the appropriate molecular ratio using respective jet nozzles. Preferably the spraying is done in one or more regions of the anode side where the spraying is controllable in each region.

At 511 an amount of fuel or water is measured at the cathode side in one or more regions or a temperature in one or more regions is determined and these measurements are used to control the spraying. If the parameters are at or below appropriate levels the rate of spraying may be increased as required 513 and appropriate on a region by region basis and the method loops back to 509. If one or more of the parameters at 511 are excessive in one or more regions, optional process 515 re-evaluates the molecular ratio and 517 shows decreasing the target rate of spraying in one or more regions of the anode side or layer and the method loops back to 509.

Referring to 609-617 controlling the amount of the fuel-water mixture or fuel and water that is available to the anode side of the membrane in the fuel cell includes providing a porous membrane having limited permeability for the fuel and water disposed between the anode side of the membrane in the fuel cell and one or more regions having the fuel and water or fuel-water mixture and proximate to the anode side of the membrane in the fuel cell. The porous membrane is selected to allow an amount of the fuel and the water to cross to the anode side that corresponds to the appropriate molecular ratio and that provides the amount of the fuel that will be electro-oxidized by the fuel cell. This porous membrane is provided with the assessment from 505 taken into consideration. In one instance, not depicted but shown structurally in FIG. 4 the porous membrane can have a fixed permeability and still accomplish its intended task for a more or less fixed load. The porous membrane with variable and preferably controllable permeability is preferably disposed between the anode side and one or more regions of the fuel water mixture or one or more fuel regions and one or more water regions.

At 611 an amount of fuel or water is measured at the cathode side in one or more regions or a temperature in one or more regions is determined and these measurements are used to control the variable permeability and thus fuel and water available to the anode. If the parameters are at or below appropriate levels the fuel available may be increased by increasing the target permeability of the porous membrane as required 613 and appropriate on a region by region basis and the method loops back to 609. If one or more of the parameters at 611 are excessive in one or more regions, optional process 615 re-evaluates the molecular ratio and 617 shows decreasing the fuel available to the anode side or increasing water available by changing the permeability or target permeability in one or more regions of the anode side or layer and the method loops back to 609.

Thus, it should be clear from the preceding disclosure that the present invention provides various apparatus and methods for limiting fuel crossover in a fuel cell. Advantageously, the apparatus and methods discussed and disclosed provide the requisite control of the crossover phenomenon for varying load levels and other environmental constraints, while operating at power levels and in packages suitable for portable electronic applications.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A fuel cell system comprising:
    a fuel cell membrane having an anode layer, a cathode layer, and an electrolyte layer disposed between said anode layer and said cathode layer, said anode layer and said cathode layer arranged to be coupled to an electrical load;
    a liquid fuel chamber disposed proximate to said anode layer at a side opposite to said electrolyte layer;
    a water storage unit disposed proximate to said anode layer at a side opposite to said electrolyte layer;
    at least one liquid fuel jet nozzle, coupled to said liquid fuel chamber, that sprays only fuel from the liquid fuel chamber on at least a first region of the anode layer;
    at least one water jet nozzle, coupled to said water storage unit, that sprays only water from the water storage unit, on at least a second region of the anode layer; and
    a controller programmed to determine an appropriate molecular ratio of the liquid fuel and water for a fuel-water mixture, the appropriate molecular ratio within an inclusive range of 0.1 to substantially equal to and including 1.0, and for independently controlling the at least one liquid fuel jet nozzle and the at least one water jet nozzle according to an amount of the liquid fuel that will be electro-oxidized by the fuel cell.

2. The fuel cell system of claim 1, wherein said fuel delivery system further includes:
    a liquid fuel pumping apparatus, coupled to and responsive to said controller for supplying the liquid fuel to the at least one liquid fuel jet nozzle.

3. The fuel cell system of claim 1, wherein said fuel delivery system further includes:
    a water pumping apparatus, coupled to and responsive to said controller for supplying the water to the at least one water jet nozzle.

4. The controller of claim 1, wherein said spraying said liquid fuel and water on said anode layer is controlled responsive to said controller assessing a demand of an electrical load coupled to the fuel cell.

5. The fuel cell system of claim 1, further comprising one or more fuel sensors proximate to said cathode layer for sensing an amount of liquid fuel at said cathode layer and providing a respective one or more signals corresponding to said amount of liquid fuel to said controller, said controller, responsive thereto, controlling said spraying the liquid fuel and water on said anode layer.

6. The fuel cell system of claim 1, wherein said controller said independently controls said spraying in one or more of said regions responsive to determining for one or more of said regions one of liquid fuel at a cathode layer of the membrane, water at said cathode layer of the membrane, and an operating temperature of the membrane.

* * * * *